United States Patent [19]

Liggett

[11] 4,312,890
[45] Jan. 26, 1982

[54] PREPARATION OF A COCOA SUBSTITUTE FROM YEAST

[75] Inventor: James J. Liggett, Twin Falls, Id.

[73] Assignee: Coors Food Products Company, Golden, Colo.

[21] Appl. No.: 149,992

[22] Filed: May 15, 1980

Related U.S. Application Data

[63] Continuation-in-part of Ser. No. 964,802, Dec. 5, 1978, abandoned, which is a continuation-in-part of Ser. No. 863,079, Dec. 22, 1977, abandoned.

[51] Int. Cl.$^3$ .......................... A23G 1/00; C12C 11/28
[52] U.S. Cl. .................................. 426/466; 426/593; 426/631; 426/431
[58] Field of Search ................... 426/631, 60, 62, 466, 426/467, 593, 431; 435/255, 256

[56] References Cited

U.S. PATENT DOCUMENTS

| | | | |
|---|---|---|---|
| 2,957,769 | 10/1960 | Rusoff | 426/431 X |
| 3,102,816 | 9/1963 | Green et al. | 426/60 X |
| 3,885,049 | 5/1975 | Taylor | 426/60 X |
| 4,097,614 | 6/1978 | West | 435/256 X |
| 4,119,740 | 10/1978 | Crespo | 426/631 |

FOREIGN PATENT DOCUMENTS

| | | | |
|---|---|---|---|
| 4939 | 7/1953 | German Democratic Rep. | |
| 27226 | 12/1938 | Poland | |
| 172788 | 12/1921 | United Kingdom | 426/631 |
| 381031 | 7/1948 | U.S.S.R. | |

OTHER PUBLICATIONS

Cocoa Requirements Reduced 50% with New Line of Extenders, Food Engineering, 1/1978, pp. 47–48.

*Primary Examiner*—David M. Naff
*Attorney, Agent, or Firm*—Bruce G. Klaas; Jerry W. Berkstresser

[57] ABSTRACT

A roasted yeast product having the characteristic texture, color, flavor, aroma and mouth-feel of cocoa powder is produced by roasting a food yeast under conditions producing a yeast temperature of about 175° C. to about 225° C. for a sufficient amount of time to develop texture, color, flavor and aroma characteristics of natural cocoa powder. The product may be used as a food flavoring agent generally and particularly as a cocoa extender, substitute or replacer in foodstuffs employing natural cocoa and/or chocolate.

23 Claims, No Drawings

PREPARATION OF A COCOA SUBSTITUTE FROM YEAST

This application is a continuation-in-part of my co-pending application Ser. No. 964,802 filed Dec. 5, 1978, now abandoned, which is a continuation-in-part of application Ser. No. 863,079 filed Dec. 22, 1977, now abandoned.

BACKGROUND AND SUMMARY OF THE INVENTION

This invention relates to a method of producing a food flavoring agent and to a product having cocoa-like flavor notes, and more particularly to a roasted yeast food flavoring product which may specifically be used as a cocoa extender, substitute and/or replacer and to methods of manufacture thereof.

Cocoa powder and chocolate are utilized extensively as consumable foodstuffs in a wide variety of applications, including use as a beverage base, and as a flavoring ingredient in formulated drinks, ice cream, cakes and biscuits, icings and confectionery coatings, confectioneries and the like. Both cocoa powder and chocolate are derived from cocoa beans which are grown only in tropical and semi-tropical climates. Most of the world's cocoa beans are grown in West Africa, Brazil, Trinidad, Ecuador, Venezuela and Java. Since the cocoa bean is a natural agricultural product, the world supply of cocoa powder and chocolate is dependent upon varying and often unpredictable weather conditions in those regions. In addition, the major cocoa powder and chocolate consuming areas of the world must import cocoa beans, thereby making cocoa powder and chocolate relatively expensive foodstuffs. For these and other reasons, many previous attempts have been made to produce products which may be substituted for cocoa powder or chocolate, or which may be used to extend cocoa powder or chocolate and thereby reduce reliance upon natural cocoa beans. Such cocoa powder or chocolate substitutes or extenders should ideally approximate the color, flavor, aroma and mouth-feel or texture of cocoa powder or chocolate and exhibit properties making them suitable for use in the wide variety of formulations in which natural cocoa powder or chocolate are used. However, since natural cocoa is a complex material comprising carbohydrate, fats, proteins, mineral matter, theobromine, caffeine, water and fibre, and undergoes extensive processing, substitutes or extenders approximating all of the properties of cocoa powder or chocolate have been difficult to obtain.

Prior cocoa powder and chocolate substitutes and extenders have included processed carob, roasted defatted wheat germ, and other processed cereal products as well as prior attempts to produce a yeast product obtaining the proper flavor characteristics. Attempts to obtain a suitable product from yeast have included U.S. Pat. No. 3,102,816 of Green et al. which discloses a process for producing a beverage flavor from yeast and sugar, for use in association with other flavor factors such as bitterness, astringency, aroma and the like to resemble a natural beverage flavor, by forming a hydrous reaction mixture of a yeast and a reducing saccharide containing at least 10% moisture and preferably two parts water to one part solids, heating the mixture to at least 350° F. in a closed reaction vessel to obtain a headspace pressure of 75 to 225 p.s.i.g. over the normal pressure for saturated steam at the reaction temperature and then rapidly reducing the temperature of the reaction mixture to below 250° F. The foregoing process, however, produces a product which must be used in association with other flavor factors to resemble a natural product and in addition requires the presence of a reducing saccharide in the reaction mixture and a relatively high level of energy input in order to conduct the process. It has been further suggested in U.S. Pat. No. 4,166,135 of Chao et al. that the flavor of a yeast product may be modified by oxygenating a slurry of fresh yeast cells with an oxygen-containing gas for from less than about 1 to about 120 minutes at a temperature of from about 45° to about 150° C. Other early processes utilizing dry yeast alone or in combination with various sugars have been disclosed which involved heating dry yeast or yeast and sugar mixtures at temperatures up to approximately 160° C. where a brown color was imparted to the yeast. There has been no known commercialization of such processes.

This was probably due in part to the difficulties encountered in obtaining a uniform satisfactory product while attempting to eliminate a yeasty taste in the final product while avoiding the charring of the yeast. These processes failed to practice the method of the present invention by failing to recognize that the dried yeast particles must reach temperatures in excess of 175° C. and not more than about 225° C., preferably about 190° C. to about 210° C. for a period of time sufficient to develop the texture, color, flavor and aroma characteristics of natural cocoa powder. The product of the present invention produces a dry roasted yeast product having the desired taste, flavor and aroma characteristics without the undesirable yeasty or burnt characteristics previously encountered. The dry product prepared according to this invention and having a moisture content of less than about 5% by weight may then be successfully employed as a food or beverage flavoring agent by for example being substituted for part or all of the cocoa powder used in foodstuff or beverage formulations, without the addition of other flavor factors normally deemed necessary for other replacers or substitutes presently employed for cocoa powder in applications where a cocoa or chocolate flavor is sought.

DESCRIPTION OF ILLUSTRATIVE EMBODIMENTS OF THE INVENTION

P As used herein, the term yeast is intended to mean fungi whose usual and dominant form is unicellular. Yeasts useful with the present invention include any yeasts and mixtures of yeasts which are suitable for human consumption, and preferably those yeasts which are generally classified as food yeasts. Illustrative examples of such yeasts include, but are not limited to, yeasts of the Saccharomyces, Candida and Brettanomyces genera, such as, for example, yeasts of the species Saccharomyces carlsbergensis (Syn. Saccharomyces uvarum), Saccharamyces cerevisiae, Saccharomyces fragilis, Candida utilis (Syn. Torulopsis utilis, ver. Torrela) and Candida tropicalis. Those years popularly known as brewers yeast, bakers yeast and wine yeast are included in the foregoing classification, and due to commercial availability are presently particularly preferred in the practice of the invention.

It is now accepted nomenclature to characterize the dried cells of Saccharamyces Cerevisiae as dried yeast, brewer's dried yeast, debittered brewer's dried yeast and primary dried yeast, the National Formulary, Eleventh Edition, 1960 and Pharmacopeia of the United States XV considers dried yeast as consisting of the dried cells of any suitable strain of *Saccharomyces cerevisiae* Meyen (Fam. Saccharomycetaceae).

Although the propagation history of the yeast has not been found to be of critical importance to the practice of the present invention, it has been found that particularly good cocoa and/or chocolate color, flavor and aroma characteristics are obtained from a roasted yeast product of the present invention utilizing a dried yeast which has been propagated in a hopped substrate or a substrate comprising hop fractions.

It is, therefore, a further presently particularly preferred practice to utilize yeast which has been recovered from a hopped brewer's wort fermentation in a conventional commercial malt beverage fermentation process, as will be hereinafter further explained, or yeast which has been propagated on a synthetic medium containing hops or hop fractions, such as acids, resins, oils, tannins and gums. However, a satisfactory product may be obtained from yeast having no prior association with brewer's wort, hops or hop fractions utilizing the teachings herein.

The terms "roast" or "roasting" as used herein mean to heat by exposure to a "dry" heat source such as by exposure to radiant heat energy or to a suitable gaseous medium, such as air, having an elevated temperature level and a relatively low moisture content. These terms do not include heating in the presence of a substantial amount of "wet" heat sources such as by steam heating, or to the utilization of abnormally or artificially high pressure levels. Those yeasts having a moisture content greater than about 5% by weight are dried prior to roasting, as hereinafter described, either as a separate step, or as the result of application of dry heat during roasting of the yeast.

It is generally known in the art of yeast processing that yeast may be dried by subjecting the yeast to a stream of hot air. See, for example, U.S. Pat. Nos. 3,993,783; 3,962,467; 2,111,201; 1,859,250; 1,643,047 and 1,420,558. However, care is taken in such processes to insure that the yeast temperature does not exceed at most about 50° C.

In producing the product of the invention, dried yeast is roasted by heating the yeast to a sufficient temperature, specifically between 175° C. and 225° C., and for a sufficient time, generally between 1 to 3 hours, if it is desired to develop the texture, color, flavor and aroma characteristics and intensities of natural cocoa powder. Although these characteristics are to some degree subjective and therefore dependent upon the ocular, gustatorial and olfactory sensitivities of a particular individual, these characteristics are qualitatively used in the food products industry by taste experts in evaluating the acceptability of a product intended for human consumptin and for characterizing its flavor notes. Optimum roasting temperatures and times may vary depending upon the specific flavoring agent characteristics sought and upon the characteristics of the particular yeast or mixture of yeasts to be treated, the degree of cocoa roasting intended to be simulated, and the particular operating conditions and environment employed in the yeast roasting process. However, for most purposes a suitable product can be obtained by roasting for 5 to 400 minutes using a variety of equipment, such as roasting the yeast in a static oven, in a moving-band conveyor oven, in open glass vessels submerged in an oil bath, or other equipment where suitable uniform contact between a heated gas and the yeast particles can be obtained and a controlled temperature for the yeast particles maintained. It has been found that texture, color, flavor and aroma characteristics of natural cocoa powder are obtained by roasting the yeast under conditions producing yeast temperatures of about 175° C. to about 225° C. and more preferably about 190° C. to about 210° C. When using the foregoing yeast heating systems, it has been found that yeast temperatures below about 175° C. produce little or no development of the desired texture, color, flavor or aroma characteristics, whereas temperatures in excess of about 225° C. results in unacceptable levels of yeast particle charring or carbonization.

The yeast is heated to the selected temperature level or range for a sufficient period of time under the particular temperature and operating conditions employed in order to develop the texture, color, flavor and aroma characteristics of natural cocoa powder. Again, optimum useful roasting times are highly dependent upon the actual temperature of the yeast during roasting, the characteristics of the yeast or mixture of yeasts to be treated, the degree of cocoa roasting intended to be simulated and the particular operating conditions and environment employed in the yeast roasting process. Generally, it has been found that under presently employed operating conditions, useful roasting times are for at least about 1 minute, more preferably about 5 to about 200 minutes and most preferably about 10 to about 150 minutes. For example, in one presently practiced embodiment of the invention wherein yeast is spread onto flat pans and roasted in a pre-attemperated static oven, it has been found that particularly good results are obtained by heating yeast to final temperatures of from between about 190° C. to about 210° C. for a total time of about 100 to about 125 minutes. However, regardless of the particular heating system and operating conditions employed, the yeast must be roasted to a sufficient temperature and for a sufficient time to obtain a roasted yeast product having the desired characteristics. During such roasting, the conditions for roasting the yeast can be selected so that the yeast undergoes chemical reactions to a degree dependent upon the roasting temperature and time, and the particular roasting system employed resulting in development of the texture, color, flavor and aroma characteristics of natural cocoa powder.

Yeast roasting may be accomplished by heating the yeast in or on a suitable supporting or transporting container, bed, cylinder or the like adapted to uniformly heat and roast the yeast. Roasting may be performed on a batchwise basis or continuously such as, for example, by passing a uniform layer of yeast on a continuous belt or other flat surface through an elongated oven. Means are preferably provided for ensuring uniform roasting of the yeast, such as means for mixing the layer of yeast on the belt during roasting. Alternatively, roasting may be accomplished by dispersing the yeast into a column of concurrent or counter-current heated air flow, or by other suitable means.

The roasting of yeast particles according to the present invention inherently results in a net reduction in the moisture content of the yeast. The roasted yeast product has a moisture content less than about 5%, more preferably less than about 2.5% and most preferably less than about 1.0% by weight. In the yeast heating systems heretofor used to practice the invention, it has been determined that the fluidity of dried yeast which has an initial moisture content less than about 10% by weight, and desirably less than 7% by weight and preferably equal to or less than 5% by weight, facilitates obtaining a uniform product from the roasting process. It is therefore a presently particularly preferred practice to use dried yeast as a starting material. Since the texture, particle size and ultimately the quality of the final product is thereby enhanced, yeast drying may be accomplished separately from roasting by means of heat and agitation alone as in a drum dryer, by means of spraying the yeast into a spray dryer employing a counter current or concurrent flow of heated air, by means of heated or unheated vacuum systems, or the like. When drying is employed as a separate step prior to roasting by utilization of heat, drying must be performed under such conditions as to favor the preservation of the original yeast qualities and composition. Spray drying is a presently particularly preferred means of yeast drying since it is particularly adapted to rigid process control, high yield and maintenance of a uniform dry yeast particle size. Yeast drying may also be accomplished during heating of the yeast for roasting, since actual roasting of the yeast does not occur until after the moisture content of the yeast has been reduced below about 5% by weight. However, it has been found that it is difficult to avoid yeast clumping and therefore difficult to obtain uniform roasting when drying is accomplished during the roasting step. It is therefore a presently preferred practice to carry out yeast drying as a separate step prior to roasting. Yeasts having very high moisture contents, such as aqueous yeast dispersions or slurries, yeast recovered from a brewers wort fermentation or other liquid yeast mixtures known in the art, are initially preferably subjected to one or more suitable yeast separation techniques, such as centrifugation, filtration or the like, and then dried as heretofore set forth. Although it is presently preferred to carry out yeast drying prior to roasting, drying and roasting may be combined with each other in any degree of association ranging from simultaneous single unit processing to tandem or separate processing.

Due to the commercial availability of brewers yeast as a product of commercial brewery operations and the unique chemical composition of brewers yeast, brewers yeast recovered from a malt beverage fermentation process is a presently preferred source of yeast for processing according to the invention. Various types of yeasts are commonly encountered in malt beverage production. Yeasts separating cleanly and efficiently from the malt beverage in the terminal stages of fermentation are generally known as "flocculent" yeasts. These yeasts respond readily to brewing practices and are easily recoverable. Yeasts generally known as "powdery" yeasts are less readily managed in brewing practices following fermentation. However, some brewers prefer powdery yeasts to insure prolonged relatively high yeast cell density for secondary fermentation, minor product synthesis and/or flavor maturation. Flocculent yeasts, powdery yeasts and ale yeasts, and yeast collected from any stage of a brewing process, may be used as a source of yeast practicing the roasting process to produce the product of the present invention.

Common malt beverage fermentations yield from about 3 to about 5 kilograms of yeast for each kilogram originally innoculated into the wort. When bottom fermenting yeasts, such as *Saccharomyces carlsbergensis* (syn. *Saccharomyces uvarum*), are employed in the wort, the yeast crop settles on the bottom of the fermentation vessel together with a variety of precipitated materials accummulated throughout the residence time of the malt beverage in the fermentation vessel to form a dense composition hereinafter referred to as "yeast crop and inclusions", or simply "yeast crop". The yeast crop comprises, for example, yeast cells in all stages of viability. The so called "cold break" in the brewing process consists of proteins, protein-polyphenol complexes, tannins, carbohydrates, hop fractions and various inclusion solids originating in the basic brewing materials, all of which are dispersed in a residual entrapped malt beverage liquid. This complex yeast crop accummulates on the bottom of the fermentation vessel becoming an increasingly thick, heavy, pasty heterogeneous mass as the fermentation process progresses, while the supernatant malt beverage becomes relatively clear with relatively low yeast densities when fully attenuated. However, those beverages designed for secondary fermentation may contain by design relatively heavy suspended yeast densities in excess of 2,000,000 yeast cells per milliliter.

For example, in order to recover a yeast crop from a malt beverage bottom fermentation process for use in the present invention, the supernatant malt beverage is decanted from the yeast crop and a sufficient quantity of the yeast crop is isolated for subsequent inoculation of process wort or for continuing the culture propagator. In the case of a top fermenting yeast, such as an ale yeast, the yeast crop is skimmed from the top of the supernatant malt beverage in a conventional manner. The remainder of the yeast crop is then preferably separated from the entrained residual malt beverage by physical separation means such as centrifugation, filtration or the like, with the recovered malt beverage being returned to the beverage production process. The recovered yeast crop, now having the physical form of a dense yeast paste, is further treated as follows to obtain yeast for roasting.

Due to the potential inclusion of hop residues and other extraneous material in the recovered yeast crop, the yeast crop is preferably subjected to a washing treatment by suspending or mixing the yeast into an aqueous solution of a suitable yeast washing agent to form a yeast slurry. Suitable yeast washing agents include the hydroxides, carbonates and bicarbonates of the alkali metals and the alkaline earth metals, including, without limitation, those compounds yielding in solution a cation selected from the group consisting of sodium, calcium, potassium and mixtures thereof and an anion selected from the group consisting of hydroxide, carbonate and bicarbonate and mixtures thereof. The limited solubility of CaO in water, i.e. about a 185 mg CaO/100 g $H_2O$ at 0° C., provides a convenient means of controlling the nature and concentration of the aqueous solution of the yeast washing agent. Therefore, a presently particularly preferred solution is a saturated slaked lime or lime water solution having a calcium hydroxide concentration of approximately 1500 ppm. The yeast slurry is preferably formed by suspending or mixing about one part of the recovered yeast crop paste with about one part of the aqueous solution of yeast washing agent and then adding sufficient additional aqueous solution to adjust the pH of the slurry as desired. The pH of the slurry may be greater than about 6.0, more preferably about 6.0 to about 8.0, and most preferably about 6.5 to about 6.7. Suspending or mixing the yeast crop in a relatively higher pH alkaline solution, may additionally result in debittering of the yeast crop.

It has also been found that the use of higher pH levels, from about 8.0 to about 10.0 can facilitate the subsequent development of flavor in a product prepared according to the practice of this invention which duplicates the flavor of so-called Dutch Chocolate or Dutched Chocolate.

It is contemplated that other yeast washing agents may be employed in the washing treatment to affect flavor and aroma characteristics of the roasted yeast product of the invention.

The yeast slurry is additionally preferably screened such as by passing the slurry through a fine mesh screen, having a mesh size sufficient to allow passage of yeast cells therethrough, of, e.g., about 100 mesh Tyler, to remove gross precipitates and various inclusion products of the brewing process. Alternatively, the yeast crop may be subjected to screening prior to initial centrifugation and separation of entrained malt beverage in the yeast crop, or at other stages of the process.

The yeast is separated from the yeast slurry by use of physical separation means such as centrifugation, filtration or the like, to concentrate the yeast crop and remove therefrom a substantial portion of the yeast washing agent. The yeast may then be dried and roasted as heretofore described to form the roasted yeast product.

When yeast has been dispersed in an aqueous solution of a yeast washing agent, as previously described, it may additionally be desirable to remove all or a substantial portion of any yeast washing agent remaining associated with the yeast. Such removal may be accomplished by eluting the washing agent with water or other suitable solvent, and may be performed at any point in the process subsequent to yeast washing.

Optionally, the "live" yeast recovered from a commercial brewing process may be deactivated prior to drying the yeast. Yeast deactivation may be accomplished, for example, by heating the yeast to a temperature of about 55° C. to about 100° C. for a minimum time of about one minute.

It is contemplated that brewers yeast recovered from a fermentation vessel may be separated from entrained malt beverage, and then directly dryed and roasted without washing, screening and eluting, as previously described.

It is further contemplated that the roasted yeast product of the invention may be comminuted, either prior to roasting, subsequent to roasting or both, to obtain a roasted yeast product having a desired average particle size simulating that of natural cocoa powder, such as, for example, about 99% through 200 mesh Tyler to about 99% through 325 mesh Tyler.

The roasted yeast product as previously described can be in the form of a powder which has the characteristic texture, color, aroma and flavor of cocoa powder, i.e., it can already be or subsequently be comminuted to the particle sizes of ground cocoa powder, and may be directly substituted for any part of, or to the total exclusion of, cocoa powder in foodstuffs utilizing cocoa and/or chocolate, such as beverages, baked goods, dairy products, candies, confections, coatings, syrups and the like.

Additionally, the product may be employed in the process known as conching in the formulation and preparation of chocolate products.

It will be appreciated from the foregoing that it is important to select and prepare starting materials and to predetermine roasting conditions so as to optimize flavor formation and color development while minimizing any alteration of the original natural nutritional qualities present in yeast.

The following illustrative examples show some of the conditions under which the roasted yeast product of the invention may be produced and incorporated into a variety of edible foodstuffs in which the product may be used as a flavoring agent. These examples are presented for purposes of illustration only and are not intended to limit in any manner the yeasts, process conditions or potential uses of the method and product of the invention.

EXAMPLE I

A brewers' bottom fermenting yeast, *Saccharomyces carlsbergenis*, var. Frohberg (Syn. *Saccharomyces uvarum*), was collected routinely from a commercial beer fermentation process following a normal, vigorous, single closed vessel primary beer fermentation.

The yeast was centrifuged to separate entrained beer from the yeast and suspended solids. The yeast was slurried into water to form a suspension of approximately 20–30% solids and was then spray dried in a commercial countercurrent hot air drier to yield a finely powdered dry yeast material of about 5% by weight moisture content. The percentage composition by weight of the dried yeast is shown approximately in Table I.

TABLE I

| Dried Yeast Composition | | |
|---|---|---|
| | Before Roasting | After Roasting |
| Protein | 45% | 44% |
| Fat | 2% | 1% |
| Carbohydrate | 40% | 43% |
| Fiber | 1% | 4% |
| Ash | 7% | 7% |
| Moisture | 5% | 1% |

Note that the yeast was not washed, debittered or treated in any manner to alter the cells, their absorbed materials or inclusion products.

The dried yeast powder mixture was then spread loosely onto a series of flat shallow pans; placed into a preattemperated, static hot air oven at 205° C. (400° F.); and allowed to roast at this temperature for a period of twenty minutes. During roasting, the yeast powder is periodically stirred to achieve uniform roasting. Prior to roasting, the dried yeast has a light beige color, is faintly aromatic, and is sharply and strongly bitter to taste. Following the roasting process the product has a distinct pleasant aroma and has developed a rich deep brown color best described as a chocolate color. The roasted product is removed from the oven and air cooled, while being protected throughout the process from accidental contamination.

A beverage is prepared using the roasted product to yield a beverage having the flavor qualities of "hot cocoa" or "hot chocolate", as follows. A drink base is prepared according to the formula of Table II:

TABLE II

| Drink Base Composition | |
|---|---|
| Sugar Granulated Fine | 592 |
| Non-Fat Dry Milk | 300 |
| Keltrol (food grade brand of | |
| Xanthan gum, Mercke & Co.) | 20 |
| Salt | 10 |

TABLE II-continued

| Drink Base Composition | |
|---|---|
| Vanilla P.F.W. | 8 |
| Imitation Cream Flavor P.F.W. | 5 |
| Beet Powder Fine Ground | 5 |
| Total Batch Weight | 940 gms |

To 9.4 gm of the drink base is added a 0.6 gm sample of the roasted yeast product as the flavoring agent replacing cocoa powder and the combined product is stirred into 100 ml of boiling water. The resulting beverage has the characteristic hot cocoa (hot chocolate) appearance, aroma, flavor and general appeal.

EXAMPLE II

The dried brewers yeast described in Example I was distributed onto a series of shallow pans and roasted in a preattemperated, static, hot air oven at an oven temperature of about 300° C. (572° F.) for an uninterrupted period of 12 minutes. During the roasting process the dried yeast develops pleasant aromatic qualities and a rich dark brown or chocolate-like color, all distinctly different from the starting material.

This roasted yeast product was prepared as a beverage as described in Example I, resulting in an acceptable cocoa flavored beverage comparable to beverages prepared from cocoa powder.

EXAMPLE III

The roasted, dried, non-debittered brewers yeast product prepared in Example I was used as a flavor replacement for chocolate in the formulation of the confection shown in Table III.

TABLE III

| | |
|---|---|
| Cocoa Butter | 52.50 gm |
| Roasted, Dried, Non-Debittered Brewers Yeast | 15.00 gm |
| Powdered Sugar | 10.00 gm |
| Imitation Vanilla Cream Flavor | 3.00 gm |
| Veltol (Food grade brand of Maltol, Pfizer & Co.) | 0.20 gm |

The roasted dried yeast product, the powdered sugar, imitation vanilla cream flavor and the Veltol were intimately mixed together and set aside while the cocoa butter was melted to a smooth, free flowing liquid in the pan of a hot water double-boiler. Double-boiler heat and constant stirring were applied continuously to the fluid cocoa butter as the entire dry mixed ingredients of Table I were slowly added and homogeneously incorporated into the "melt".

The product thus produced had a light brown color and a sweet pleasant aroma both resembling enrobing chocolate. The combined fluid product was poured into molds and allowed to "set" (harden) at room temperature to soft but firm solid bars. The product bars had the characteristic texture, appearance, aroma and flavor of chocolate enrobing bars and have been found to be an enjoyable confection.

EXAMPLE IV

Roasted, dried, non-debittered brewers yeast was prepared as in Example II and was substituted in the formulation of Example III, Table III, replacing the roasted yeast product prepared according to Example I.

A confection is prepared from this new formulation following the procedures outlined in Example III.

The confection thus produced has the characteristic texture, color, flavor, aroma and mouth-feel of an enrobed bar.

EXAMPLE V

The roasted, dried, non-debittered brewers yeast product prepared in Example I was used in formulation of a cocoa substitute for baked goods, as shown in Table IV.

TABLE IV

| Baked Good Ingredients | |
|---|---|
| 887.85 gm sugar | 81 gm buttermilk powder |
| 325.8 gm butter | 18 gm butter vanilla #218 |
| 144 gm egg | 2¼ cup water |
| 765.6 gm flour | 3 gm baking soda |
| 4.5 gm salt | |

160.5 gm roasted, dried non-debittered yeast. The sugar, butter and egg were creamed together and the buttermilk powder, butter vanilla #218 and water was added to form a mixture. The flour, yeast product, baking soda, and salt were thoroughly intermixed and then added to the above mixture to form a dough-like composition that was dropped by the rounded teaspoon on a lightly greased pan. The pan and contents are then placed in a preheated oven at 400 degrees F. for approximately eight minutes. The baked goods, which resemble ordinary chocolate cookies, were then removed from the oven and allowed to cool.

The resulting cookies had the characteristic flavor, texture, aroma and color of chocolate cookies.

EXAMPLE VI

The roasted, dried, non-debittered brewers yeast prepared as in Example II was substituted in the formula of Example V, Table IV. A baked good was prepared and tested following the procedures outlined in Example V.

The baked good so produced was equivalent to the baked good of Example V.

EXAMPLE VII

A brewers bottom fermenting, non-debittered dried yeast was obtained from a source unrelated to the source of yeast employed in Examples I-VI. This yeast was known to be of different culture and variation, and further known to be from a yeast crop of commercial beer fermentation employing entirely different wort media, brewing process and fermentation practices from that applied to the history of yeasts in Examples I-VI.

This distinctly different non-debittered, dried brewers yeast was roasted according to the procedures outlined in Example I. The resultant product was, for all pertinent properties, identical to the product of Example I.

A beverage prepared according to Example I with the substitution of the present yeast product had a pleasant, sweet cocoa aroma and flavor and was found to be an acceptable cocoa flavored beverage.

EXAMPLE VIII

The brewers non-debittered dried yeast described and used in Example VII was roasted according to the procedures contained in Example II and the resultant product was used to prepare a beverage as described in Examples I, II and VII. The resulting beverage was similar to a cocoa or "hot chocolate" beverage and was found to be completely satisfying and pleasant.

EXAMPLE IX

Following the procedure of Example I, a roasted, dried, non-debittered brewers ale yeast, *Saccharomyces cerevisiae*, was prepared from which a palatable, distinctive cocoa flavored beverage is prepared following description of said example.

EXAMPLE X

Following the procedures of Example II an acceptable cocoa beverage was prepared from the resultant toasted, dried, non-debittered yeast where the yeast source was a brewers ale yeast, *Saccharomyces cerevisiae*.

EXAMPLE XI

A bakers yeast, *Saccharomyces cerevisiae*, whose history is believed to be unrelated to exposure to brewing processes and wort, was experimentally propagated in a wort and collected following a normal closed vessel primary fermentation. The yeast slurry was centrifuged, spray dried, and roasted according to Example I. Following the roasting process, the product had the color, flavor, aroma and mouth-feel of natural cocoa.

The product was used to prepare a beverage as described in Example I. The resulting beverage had notes of cocoa flavor in the beverage, although the quality of the beverage is deemed inferior in chocolate flavor likeness to the beverage prepared in Example I.

EXAMPLE XII

Bakers yeast propagated as described in Example XI was prepared and roasted according to the procedures of Example II. The product was used to prepare a beverage as described in Example I. The beverage had cocoa flavor notes, although the flavor is not equivalent to that of the beverage prepared in Example II.

EXAMPLE XIII

A yeast crop comprising a brewers bottom fermenting yeast, *Saccharomyces carlsbergensis*, var. Frohberg (*Saccharomyces uvarum*) was collected routinely from a commercial beer fermentation process following a normal, vigorous, single closed vessel primary beer fermentation. The mixture was centrifuged to separate entrained beer from the yeast.

Immediately following centrifugal separation, the yeast crop was dispersed in a sufficient quantity of a saturated lime water solution to form a yeast slurry having a pH of 6.6. The yeast slurry was then passed through a vibrating 100-mesh screen to remove debris and centrifuged to form a relatively thick yeast paste having a solids content of about 20–30% by weight. The yeast was then deactivated by heating the yeast in a wiped-film heat exchanger at a temperature of 75° C. for one minute. The deactivated yeast was then dried to a moisture content of about 1% by weight by spraying the yeast slurry at the rate of 2 kg/hr. into a spray dryer having a countercurrent air flow at an inlet temperature of about 250° C. and an outlet temperature of about 100° C.

The dried yeast was then spread uniformly to a depth of ¼ inch onto a continuous belt and passed at a speed of 4.5 feet per minute through a band oven having a length of 15 feet, an ambient entrance temperature at the belt of about 23° C. and exit temperature at the belt of 238° C. The yeast was then allowed to cool to ambient temperature.

The roasted yeast product thus prepared was substituted for the roasted yeast in Examples I, III and V. The foodstuffs so formulated therefrom had the characteristic texture, color, flavor, aroma and mouth-feel of corresponding foodstuffs formulated from cocoa powder.

EXAMPLE XIV

In order to determine the nature of the changes which yeast undergoes at various temperature levels, 25.0 g. samples of the dried yeast of Example I was placed in test tubes and heated under constant stirring in an oil bath having a temperature of 225°–265° C. The temperature of the yeast is shown in Table V:

TABLE V

| Elapsed Time (Minutes) | Temperature (°C.) of Sample No. | | | | | | |
|---|---|---|---|---|---|---|---|
| | 1 | 2 | 3 | 4 | 5 | 6 | 7 |
| 0 | 19 | 18 | 18 | 18 | 25 | 25 | 26 |
| 1 | 105 | 91 | 118 | 130 | 90 | 65 | 97 |
| 2 | 137 | 128 | 158 | 157 | 119 | 115 | 115 |
| 3 | 156 | 144 | 170 | 174 | 137 | 133 | 140 |
| 4 | 169 | 160 | 187 | 196 | 152 | 153 | 160 |
| 5 | 185 | 166 | 198 | 205 | 162 | 165 | 171 |
| 6 | 189 | 185 | 211 | 213 | 170 | 172 | 181 |
| 7 | 205 | 193 | 217 | 215 | 179 | 183 | 184 |
| 8 | 211 | 205 | 222 | 228 | 187 | 190 | 190 |
| 9 | 220 | 212 | 229 | 225 | 195 | 197 | 196 |
| 10 | 215 | 216 | 229 | 228 | 200 | 204 | 202 |
| 11 | 222 | 225 | 231 | 225 | 206 | 210 | 208 |
| 12 | 222 | 218 | 233 | 229 | 211 | 216 | 218 |
| 13 | 218 | 210 | 229 | 225 | 216 | 222 | 226 |
| 14 | 224 | 219 | 233 | 228 | 224 | 230 | 233 |
| 15 | 135 | 220 | 138 | 224 | 229 | 233 | 234 |
| 16 | 65 | 223 | 83 | 229 | 232 | 233 | 235 |
| 17 | 33 | 219 | 47 | 226 | 230 | 230 | 230 |
| 18 | 25 | 225 | 33 | 226 | 225 | 223 | 221 |
| 19 | | 221 | 23 | 160 | 219 | 219 | 218 |
| 20 | | 222 | 19 | 95 | 220 | 215 | 210 |
| 21 | | 221 | | 58 | 216 | 175 | 132 |
| 22 | | 224 | | 20 | 170 | 105 | 88 |
| 23 | | 220 | | | 108 | 70 | 65 |
| 24 | | 225 | | | 76 | 50 | — |
| 25 | | 221 | | | 49 | 39 | 37 |
| 26 | | 219 | | | 35 | 35 | 28 |
| 27 | | 223 | | | 27 | 30 | |
| 28 | | 221 | | | | 29 | |
| 29 | | 223 | | | | 26 | |
| 30 | | 170 | | | | | |
| 31 | | 85 | | | | | |
| 32 | | 47 | | | | | |
| 33 | | 28 | | | | | |
| 34 | | 20 | | | | | |

During the foregoing study, the following phenomena are noted to occur with regularity and consistency: (a) From 25° C. to about 65° C. the yeast stirs fairly smoothly and virtually no color change occurs. (b) From about 65° C. to about 145° C., the yeast must be stirred vigorously in order to maintain homogeneity. A very slight color change is perceivable with the yeast becoming very light tan. (c) From about 145° C. to about 160° C. the yeast color darkens abruptly, particularly between about 145° C. and 150° C. There is a distinct change in yeast consistency and volatile materials are noted to evolve from the yeast. (d) From about 160° C. to about 190° C. the color of the yeast continues to darken and the consistency becomes smooth. A very small amount of volatiles are noted to evolve from the yeast which have a very pleasant aroma. (e) From about 190° C. to about 210° C. a sharp transition in the color and texture of the yeast is noted to occur, with the color becoming a light brown and the texture becoming granular and difficult to manage. Volatiles evolving from the yeast are noted to increase with the aroma becoming more pronounced. (f) From about 210° C. to about 220° C. few changes in the yeast are noted, the yeast merely becoming more fluid and easily stirred. (g) From about 220° C. to about 225° C. the color deepens rather rapidly and an increase in evolving volatiles is noted, with an accompanying increase in aroma. The yeast initially cakes readily, but after maintenance at the temperature level for about 5 to about 10 minutes, becomes more readily managed. (h) From about 225° C. to about 235° C. a self perpetuating exothermic reaction is noted resulting in an uncontrollable temperature rise. In this range, the yeast color develops rapidly and a burnt, smoky aroma is noted. (i) Above 235° C. the yeast is noted to char and carbonize.

EXAMPLE XV

Two samples of the dried yeast of Example XIII were spread to a depth of about 8.5 mm across the surface of sheet-type pans having a length of about 40.0 cm and a width of about 32.5 cm, leaving an uncovered marginal edge of about 2.0 cm around the periphery of the pan. Sample Nos. 1 and 2 comprises about 1.13 kg and 1.25 kg of the dried yeast, respectively. The dried yeast was then slightly mounded by drawing a grooved mastic spreader across the surface of the yeast on each pan to form grooves in the yeast having a depth of about 6.0 mm and a distance between grooves of about 4.0 mm.

The dried yeast samples were then placed in a preat-temperated static hot-air oven having an initial temperature of about 182° C. At various times during roasting, the pans are removed from the oven and the yeast on each pan were turned, mixed, leveled and remounded, as heretofore described. Due to opening of the oven door for removal and insertion of the pans, the actual oven temperature is noted to vary. The temperature of the oven and the yeast samples is set forth in Table V:

TABLE VI

| Elapsed Time (Minutes) | Temperature (°C.) | | |
|---|---|---|---|
| | Oven | Sample No. 1 | Sample No. 2 |
| 0 | 195 | 21 | 21 |
| 9 | 178 | 104 | 104 |
| 13 | 189 | 122 | |
| 19 | 192 | | 136 |
| 23 | | 172 | |
| 31 | 195 | 150 | |
| 34 | | | 165 |
| 42 | 206 | | 178 |
| 47 | 184 | 162 | |
| 55 | 192 | | 178 |
| 64 | 195 | 187 | |
| 72 | 195 | | 189 |
| 82 | 195 | | 183 |
| 90 | 198 | 192 | |
| 100 | 195 | | 191 |
| 108 | 200 | 200 | |
| 120 | 198 | | 199 |

The samples were removed from the oven after 108 and 120 minutes, respectively, after which time both samples were allowed to cool. The yeast of both samples were noted to have a dark brown color resembling that of natural cocoa powder.

While the product and method of the invention have been described in association with various presently preferred embodiments, it is contemplated that various modifications will be apparent to those persons skilled in the art. Such modifications are intended to be within the scope of the appended claims except insofar as precluded by the prior art.

What is claimed is:

1. A method of producing a cocoa substitute exhibiting the color, flavor and aroma characteristics of natural cocoa comprising roasting dry yeast under conditions producing yeast temperatures of about 175° C. to about 225° C. for between one to three hours.

2. The method of claim 1 wherein the yeast is rotated at yeast temperatures of about 190° C. to about 210° C.

3. The method of claim 1 wherein the dry yeast is produced by drying a yeast having greater than about 7% moisture to a moisture content of less than about 5% by weight prior to roasting the yeast.

4. The method of claim 3 wherein the yeast is dried to a moisture content of less than about 1% by weight.

5. The method of claim 1 wherein the yeast is washed prior to roasting the yeast.

6. The method of claim 5 wherein the yeast is washed by mixing the yeast into an aqueous solution including a yeast washing agent.

7. The method of claim 6 wherein the yeast washing agent is a compound soluble in water which provides a cation in solution selected from the group consisting of $Na+$, $K+$, $Ca++$ and mixtures thereof, and an anion in solution selected from the group consisting of $OH^-$, $CO_3^{--}$, $HCO_3^-$ and mixtures thereof.

8. The method of claim 6 wherein the yeast washing agent is derived from the inclusion of CaO dissolved in said aqueous solution.

9. The method of claim 5 wherein the yeast is debittered by said washing.

10. The method of claim 6 wherein the yeast is eluted after mixing in the aqueous solution to remove a substantial portion of residual yeast washing agent.

11. The method of claims 3 wherein the yeast is inactivated prior to drying the yeast.

12. The method of claim 11 wherein the yeast is inactivated by heating the yeast to temperatures of about 55° C. to about 100° C. for a period of at least one minute.

13. A method of producing a roasted yeast product from food yeast, comprising:
  mixing food yeast into an aqueous solution comprising a yeast washing agent and having a pH greater than about 6.0 to form an aqueous yeast slurry;
  screening the slurry to remove therefrom suspended solids;
  separating the yeast from the yeast slurry;
  eluting the yeast to substantially remove residual washing agent;
  drying the yeast to a moisture content of less than about 5% by weight; and
  roasting the yeast under conditions producing yeast temperatures of about 175° C. to about 225° C. for between one to three hours.

14. The method of claim 13 wherein the yeast is dried by passing the cells downward through a vertical column against a counter-current flow of air.

15. The method of claim 14 wherein the aqueous solution has a pH sufficiently high to obtain debittering of the yeast.

16. The method of claim 13 wherein the yeast washing agent is a soluble compound having a cation in solution selected from the group consisting of $Na+$, $K+$, $Ca++$ and mixtures thereof, and having an anion in solution selected from the group consisting of $OH^-$, $CO_3^{--}$, $HCO_3^-$ and mixtures thereof.

17. The method of claim 13 wherein the yeast is mixed into about two to about four times its volume of aqueous solution.

18. The method of claim 13 wherein the yeast is separated from the yeast slurry by passing the slurry through a continuous centrifuge.

19. The method of claim 13 wherein the yeast is roasted at yeast temperatures of about 190° C. to about 210° C.

20. The method of claim 13 wherein the yeast is roasted by spreading the yeast into a substantially uniform layer across a flat surface and then subjecting the yeast to the roasting temperature.

21. The method of claim 20 wherein the layer is mixed during the roasting step.

22. The method of claim 13 wherein the yeast is milled after roasting.

23. A cocoa substitute product produced by the method of claim 1.